US008949221B1

(12) United States Patent
van Rotterdam et al.

(10) Patent No.: US 8,949,221 B1
(45) Date of Patent: Feb. 3, 2015

(54) SYSTEM AND METHOD OF DISTRIBUTED QUERY EXECUTION

(75) Inventors: Jeroen van Rotterdam, Berkeley, CA (US); Mark Polman, Rotterdam (NL)

(73) Assignee: EMC Corporation, Hopkinton, MA (US)

( * ) Notice: Subject to any disclaimer, the term of this patent is extended or adjusted under 35 U.S.C. 154(b) by 337 days.

(21) Appl. No.: 13/341,529

(22) Filed: Dec. 30, 2011

(51) Int. Cl.
*G06F 17/30* (2006.01)

(52) U.S. Cl.
USPC .......................................... 707/718; 707/769

(58) Field of Classification Search
CPC ................... G06F 17/30929; G06F 17/30938; G06F 17/30545; G06F 17/30424; G06F 17/30979; G06F 17/3084; G06F 17/30634; G06F 8/31; G06F 17/30433; G06F 17/30864; G06F 17/30657; G06F 17/30923
USPC ................................................. 707/718, 769
See application file for complete search history.

(56) References Cited

U.S. PATENT DOCUMENTS

| 7,987,181 | B2 * | 7/2011 | Borthakur et al. | 707/719 |
|---|---|---|---|---|
| 8,312,030 | B2 * | 11/2012 | Liu et al. | 707/756 |
| 2004/0054691 | A1 * | 3/2004 | Sharma et al. | 707/104.1 |
| 2006/0036578 | A1 * | 2/2006 | Cheslow | 707/3 |
| 2007/0219959 | A1 * | 9/2007 | Kanemasa | 707/3 |
| 2008/0162442 | A1 * | 7/2008 | Agarwal et al. | 707/4 |
| 2009/0132544 | A1 * | 5/2009 | Hattori | 707/10 |
| 2009/0157671 | A1 * | 6/2009 | Cheslow | 707/5 |
| 2009/0228514 | A1 * | 9/2009 | Liu et al. | 707/102 |
| 2010/0211560 | A1 * | 8/2010 | Liu et al. | 707/720 |
| 2013/0238604 | A1 * | 9/2013 | Robie et al. | 707/722 |

* cited by examiner

*Primary Examiner* — Thanh-Ha Dang
(74) *Attorney, Agent, or Firm* — John Gould; Theodore A. Chen; Krishnendu Gupta

(57) ABSTRACT

A method, article of manufacture, and apparatus for searching a computing environment, such as a cloud data repository. In some embodiments, this includes providing an extension function for distributed execution of queries. In some embodiments, subqueries or subexpressions of a query may be executed in parallel amoung different repositories or collections.

9 Claims, 3 Drawing Sheets

SYSTEM AND METHOD OF DISTRIBUTED QUERY EXECUTION

FIELD OF THE INVENTION

This invention relates generally to data systems, and more particularly to systems and methods for finding and accessing data in data systems.

BACKGROUND OF THE INVENTION

XPath, and more broadly, XQuery, is a programming and query language designed to select nodes from XML documents, and more generally to query XML data repositories. In a highly-distributed data repository system implemented as an XML database, such as a cloud or other multi-tenant environment, typically there is no notion of a centralized server, or "global" database view against which queries may be executed to query the entire repository from a single view. In other words, XQuery lacks the capability to model or describe a persistent state of a database, as such. XQuery does support access collections of nodes at runtime, which could be said to be analogous to the persistent state of a database. However, even such collections have no detailed database semantics, and XQuery provides no functionality to statically declare such collections. This is generally because XQuery lacks the information (both static and dynamic) that is required for proper compilation and execution against such collections. Further XQuery lacks operations to create and modify such collections, or to declare and manage access structures, such as through the use of indexes.

When queries are executed against a distributed repository, such as an XML repository, there is no existing way to limit the body of data or section of the repository where the query needs to be executed, or otherwise pinpoint or focus on a target section of the repository to be searched. This problem is exacerbated in XML repositories, as such repositories are organized into hierarchical collections. Collections are sequences of nodes that are potentially available using the fn:collection function.

Turning to the multi-tenant or cloud scenario, the nodes or the collections of a repository may typically be organized on a tenant-by-tenant basis, so a tenant executing a query typically has no wish to, and ideally will be prevented from, running the query on other tenant's data.

There is a need, therefore, for an improved method, article of manufacture, and apparatus for more targeted and efficient querying of data in XML data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
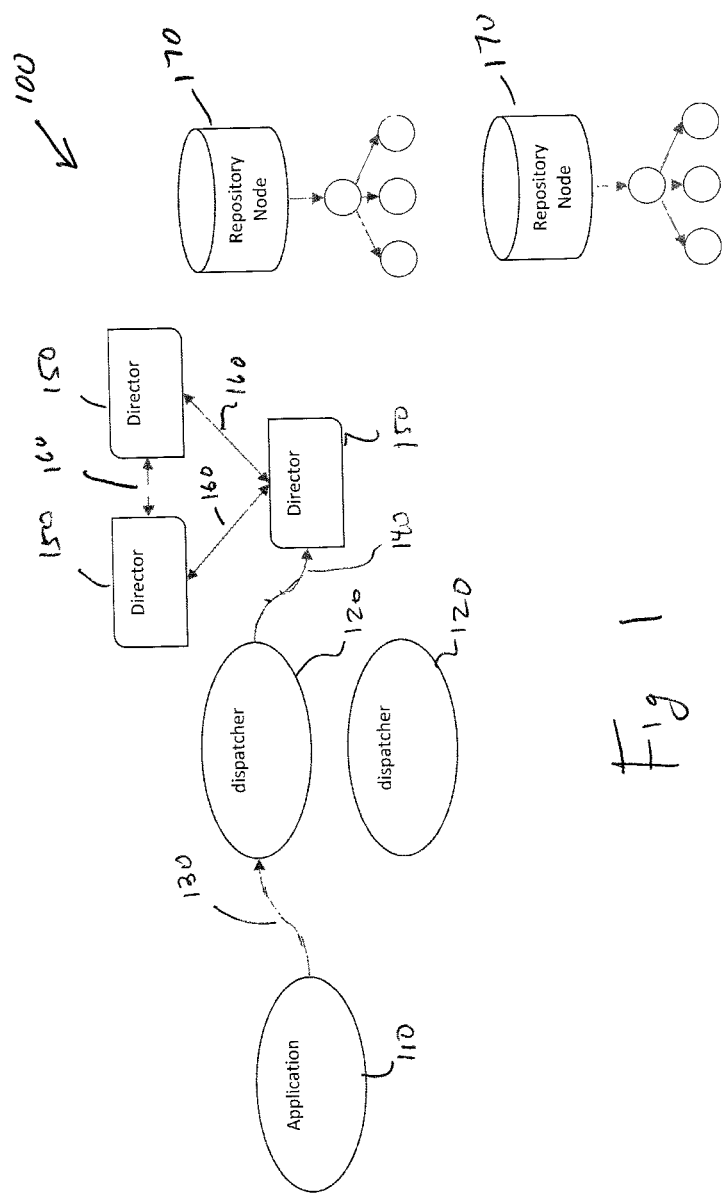
FIG. 1 depicts a data system in accordance with some embodiments of the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard-coded in hardware or in firmware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, and particularly data objects, in analog, digital, or other form. Although terms such as document, file, object, etc. may be used by way of example, the principles of the invention are not limited to any particular form of representing and storing data or other information; rather, they are equally applicable to any manner of representing information. Similarly, while reference may be made herein to a database, data system, document storage system, data repository, or similar systems or data collections; reference to one type of these systems should be taken to refer to all such suitable systems unless explicitly stated otherwise.

The present invention provides a system and method to request execution on a remote repository node, and further provides for the efficient collection of data and aggregation of responses in an expected result. For purposes of XML databases, a repository node is an independent database that contains a partition of the data and/or replicated data and operates, in a coordinated fashion, with other repository nodes to offer a scale-out repository that is effectively "global" in operation, that is, presents a single coherent database to the user not limited to a particular pre-defined collection or context.

Since XML databases offer hierarchical collections of data, a distributed XQuery execution should be able to select the right sub-collection(s) and define that set of sub-collections as the query context for purposes of a given query or set of queries. Particularly in the case of a multi-tenant public cloud solution, where the system itself can host multiple tenants, a query may be executed, for example, in the defined context of a single tenant. While XQuery is a rich and flexible language, distributed XQuery execution is particularly difficult, since the query language is so rich and therefore, in the course of query execution, it is typically necessary to break down the query into arbitrary subexpressions to be applied to one or more backend repository nodes. The execution of these subexpressions against a number of backend nodes leads to large processing overhead and server load, and will generally tend to increase latency in query execution.

For purposes of the instant invention, a repository node is an independent database that contains a partition of the stored data and/or replicated data and is participating, in a coordinated fashion, with other repository nodes. The data for each tenant can be stored in one or more repository nodes, and within each such node, in one or more collections. The context for a query may, but need not be, limited to the data of a single tenant; so the context can represent a superset and/or subset of a tenant's data. The selected context may also contain additional hints or parameters to further narrow done the context for query execution, as appropriate to the query being executed.

The repository context, as used herein, is defined as the set of repository node and hierarchical collection combinations applicable to a particular context. The repository context is a function of, i.e. can be determined by, the context, the query being executed, and the nature of the repository nodes (and the data residing therein). Embodiments of the instant invention provide a method to execute an XQuery expression over a selective number of independent back-end repositories. Further embodiments provide a method to execute XQuery subexpressions over a selective number of independent back-end repositories, and/or sub-repositories.

Embodiments of the invention provide a dispatcher function capable of handling (e.g., parsing and executing) an XQuery request. For example, the dispatcher may be provided with an XQuery request through a suitable interface, which may be a representational state transfer (RESTful) interface, or other suitable interface such as a stateless client-server interface. The dispatcher function may be referred to as an instance of an XQueryService function, thread, daemon, or other instantiation of a set of computer commands, expressions, instructions, or processes.

The dispatcher is responsible for dispatching the query execution to the right repository nodes appropriate for the handling of the query in its entirety, if appropriate, or otherwise some subset of the query. In turn, each dispatched subquery may be handled by the dispatcher or additional dispatchers appropriate for the repository or sub-repository nodes appropriate to the query or subquery. The dispatcher(s) may also be responsible for the collection and coordination of the responses (i.e., results) from each subquery that they have dispatched to the relevant sub-repositories.

A director module or function, alternatively called the partitioning module, may be created which is capable of determining the target repository nodes and corresponding collection or collections needed to execute a given XQuery, or subquery thereof, for a given content parameter. In other words, the director determines where the data needed to properly execute the XQuery resides. Similarly, the director also determines what resources or repositories will be charged with the required subtasks, and accordingly, which will have to work to execute the given XQuery.

Embodiments of the invention also introduce an extension function for distributed execution for suitable query languages, which may be called using the expression "ef:de( )" (extension function:distributed execution). This function may allow for the creation of subexpressions in an XQuery query, collection function, path expression, FLWOR expression, or other XQuery or XPath expression. The extension function:distributed execution may create or spawn XQuery subexpressions that may be executed in parallel in different backend repository nodes or collections. Such an XQuery service may be run as a standalone process. Alternatively, an XQueryService, such as an XQueryService of an extension function:distributed execution, may be part of or may reside in or at a repository node. Suitable extension functions may be created using, for example, a Java API to the XML repository being queried.

FIG. 1 depicts a data system 100 in accordance with some embodiments of the invention. When an end-user or application 110 wants to execute a distributed XQuery, the user or application 110 (generally, "application" 110) may select any of the available dispatcher processes or modules 120 running or available for execution. The user 110 may pass the XQuery, together with the appropriate context parameters, over data flow 130 to the dispatcher process 120 for execution.

The dispatcher 120 consults, via data flow 140, any of the available director processes or modules150 to ask which query services should execute the query, and in which particular repository context the query should be executed. In certain embodiments, director processes/modules 150 may communicate with each other via data flows 160 as to the status of requested, running, and completed queries, thus keeping each other informed as to workload, balance, failure, and appropriate contexts so that efficient and appropriate allocations of query demands, and designation of appropriate and efficient repository and sub-repository resources 170 may be optimized.

A director 150 may inform a dispatcher 120 which query services should participate in the XQuery execution originally passed via data flow 130 to dispatcher 120 for handling, and which repository context 170 to use for evaluation of the XQuery expression. In some embodiments, the dispatcher 150 itself can be asked to participate for a part of evaluation of the query expression, for example, with respect to a particular subrepository 170, or for the entire query.

Figure 2:
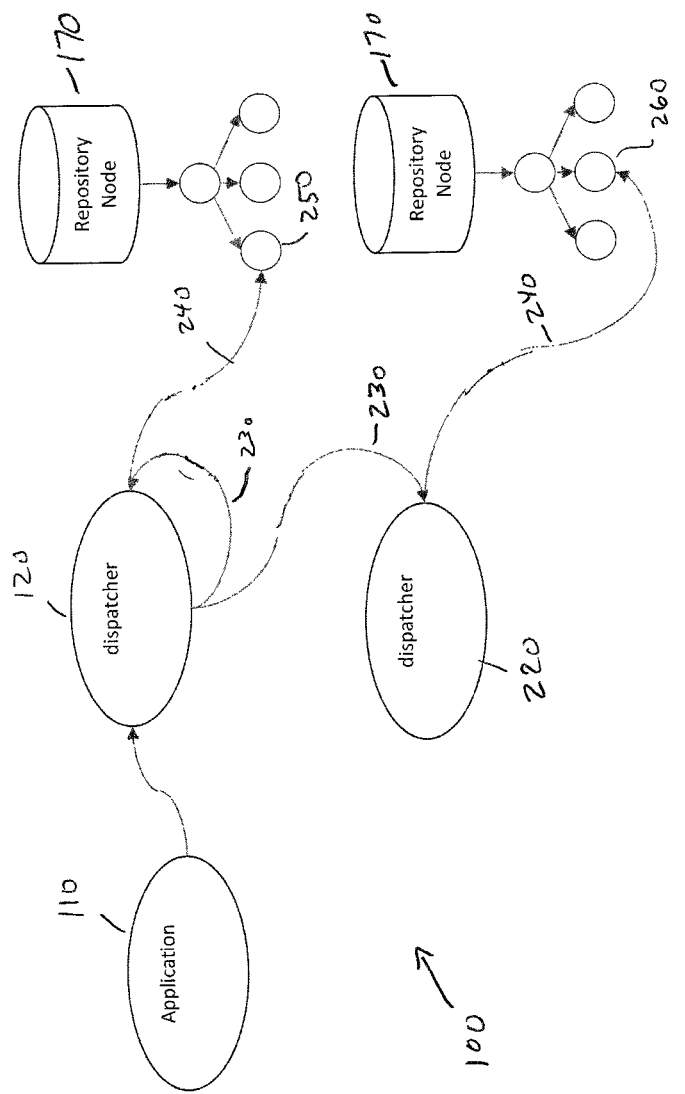
FIG. 2 depicts certain data flows in a data system in accordance with some embodiments.

FIG. 2 depicts certain data flows in a data system in accordance with some embodiments. Based on the information from the director 150 depicted in FIG. 1, in certain embodiments the dispatcher 120 may distribute the XQuery via data flows 230 over multiple additional sub-dispatchers 220, potentially including the originally-distributing dispatcher 120, using the same query service. The originating dispatcher 120 may also dictate the repository context, as received from the director 150 depicted in FIG. 1, in the sub-dispatched queries or subqueries. Each of the dispatchers 120, 220 charged with executing part of the distributed XQuery may now, via data flows 240, execute the query in the repository contexts (sub-repositories 170 and/or collections 250, 260) designated by the director 150. In the example depicted in FIG. 2, for example, each dispatcher 120, 220 may execute the query in sub-repositories or collections 250 and 260, respectively, in accordance with the designation of director 150 of FIG. 1.

While the dispatchers 120, 220 execute their assigned subquery, one or more dispatchers 120, 220 may encounter the extension function ef:de (subexpression) indicating that their subquery contains a subexpression. In the event that the executing dispatcher 120, 220 encounters such a subexpression, the dispatcher 120, 220 may, in certain embodiments, inquire of a director 150 of FIG. 1 where to execute the subexpression and against which repository context. Based on the response received from the director 150 of FIG. 1, the dispatcher 120, 220 may continue the execution of the subexpression in a manner similar to the execution of the original query containing the subexpression. Subexpressions may be executed in parallel by different dispatchers 120, 220 in different backend repository nodes 170 or collections 250, 260.

Figure 3:
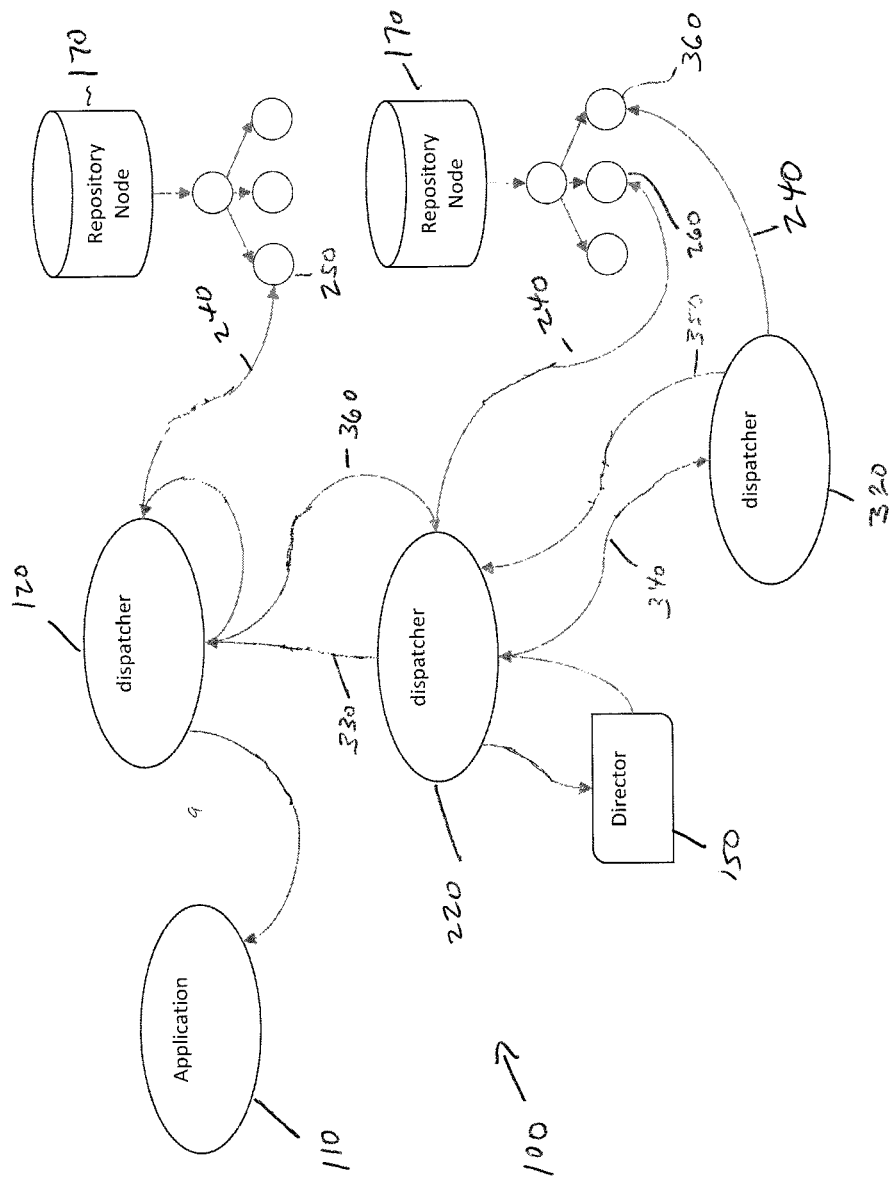
FIG. 3 illustrates certain additional data flows in a data system in accordance with some embodiments of the invention.

FIG. 3 illustrates certain additional data flows in a data system in accordance with some embodiments of the invention. Upon the completion of a subexpression, or XQuery, for example by a dispatcher 220, the dispatcher 220 may return the results for its assigned context to its immediate requestor, i.e. the original dispatcher 120, via data flow 330. In the case of original dispatcher 120, dispatcher 120 may return the results for its assigned context directly to application (or end-user) 110 which requested the execution of the subexpression by the dispatcher 120. Generally, certain embodiments will have each dispatcher 120, 220, collect the results of subexpressions which it requested of other dispatchers. For example, in the case of subexpressions executed by dispatcher 320 in response to a request from dispatcher 220 via data flow 340, the immediate requestor of execution of the subexpression, dispatcher 220, was in turn the recipient of another request from dispatcher 120, the subexpression's immediate requestor 220 will return the results of the subexpression, received from dispatcher 320 via data flow 350, to its requestor dispatcher 120, via data flow 360, until the complete result across all relevant contexts is correctly compiled, and returned to the ultimately requesting end user or application 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined, or processes may invoke other processes to handle certain tasks. References herein to "services," "processes," "methods," "tasks," and similar terms should be understood as encompassing services, methods, applications, applets, functions, modules, daemons, threads, scripts, tasks, and other computer processes, however denominated. While some processes or methods may be described as "expecting," "desiring," or "accepting" certain information or results, or more generally performing an action (e.g. "obtaining"), it will be appreciated by those skilled in the art that that these processes need not be sentient or have consciousness or agency, rather, anthropomorphic language indicating expectations or wishes is intended only to illustrate that the process or method may be designed to process or use certain types of arguments, or data having certain qualities or types, and that other arguments or data may result in error, failure, exception, overflow, abnormal termination, abend, core dump, or "crash;" or otherwise unexpected, inaccurate, undesirable, or suboptimal results or output. As disclosed herein, software written in accordance with the present invention may be stored in some form of computer-readable medium, such as memory or CD-ROM/optical media, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers, processors, or partitions such that, as a whole, they perform the functions of the components identified herein; i.e. they take the place of a single computer. Various functions described above may be performed by a single process or groups of processes, on a single computer or distributed over several computers. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method of evaluating a query against a data repository comprising a non-transitory storage device having at least one data partition, the method comprising:
   receiving a query at a dispatcher;
   communicating the query from the dispatcher to a director, the director comprising a module enabled to determine at least one repository node needed to execute the query, wherein the at least one repository node is in the data repository;
   dividing the query into at least two subqueries at the director, each subquery corresponding to pertinent information residing in different collections of the data repository;
   dividing at least one partition comprising tenant data into a set of at least two collections, wherein the partition resides on the at least one repository node;
   defining the context at the director for each subquery so as to encompass a collection containing the information pertinent to each subquery;
   communicating the subqueries from the director to the dispatcher;
   distributing at least one of the subqueries to a subdispatcher;
   evaluating the at least one of the subqueries against the defined context for the at least one of the subqueries context at the subdispatcher;
   gathering the information responsive to the at least one subquery; and
   returning the information as the response to the received query.

2. The method of claim 1, wherein the evaluation of the subquery is affected by an extension to XQuery.

3. The method of claim 2, wherein the extension comprises a function enabling distributed execution, the extension further comprising a subexpression.

4. The method of claim 3, further comprising encountering the subexpression when evaluating the at least one of the subqueries.

5. The method of claim 4, further comprising inquiring the director where to execute the subexpression.

6. The method of claim 5, further comprising:
   receiving a response from the director; and
   executing the subexpression based on the response.

7. A system for organizing data, comprising a storage device and a processor configured to:
   receive a query at a dispatcher;
   communicate the query from the dispatcher to a director, the director comprising a module enabled to determine at least one repository node needed to execute the query, wherein the at least one repository node is in the data repository;
   divide the query into at least two subqueries at the director, each subquery corresponding to pertinent information residing in different collections of the data repository;
   divide at least one partition comprising tenant data into a set of at least two collections, wherein the partition resides on the at least one repository node;

define the context at the director for each subquery so as to encompass a collection containing the information pertinent to each subquery;

communicate the subqueries from the director to the dispatcher;

distribute at least one of the subqueries to a subdispatcher;

evaluate the at least one of the subqueries against the defined context for the at least one of the subqueries context at the subdispatcher;

gather the information responsive to the at least one subquery; and return the information as the response to the received query.

8. The system of claim 7, wherein the at least one partition is a logical data partition.

9. A computer program product for querying data stored in a repository, comprising a non-transitory computer readable medium having program instructions embodied therein for:

receiving a query at a dispatcher;

communicating the query from the dispatcher to a director, the director comprising a module enabled to determine at least one repository node needed to execute the query, wherein the at least one repository node is in the data repository;

dividing the query into at least two subqueries at the director, each subquery corresponding to pertinent information residing in different collections of the data repository;

dividing at least one partition comprising tenant data into a set of at least two collections, wherein the partition resides on the at least one repository node;

defining the context at the director for each subquery so as to encompass a collection containing the information pertinent to each subquery;

communicating the subqueries from the director to the dispatcher;

distributing at least one of the subqueries to a subdispatcher;

evaluating the at least one of the subqueries against the defined context for the at least one of the subqueries context at the subdispatcher;

gathering the information responsive to the at least one subquery; and returning the information as the response to the received query.

* * * * *